United States Patent
Hasegawa

(10) Patent No.: US 12,217,222 B2
(45) Date of Patent: Feb. 4, 2025

(54) ELECTRONIC RECEIPT ISSUING APPARATUS, ELECTRONIC RECEIPT ISSUING METHOD AND NON-TRANSITORY STORAGE MEDIUM

(71) Applicant: NEC Corporation, Tokyo (JP)

(72) Inventor: Keiji Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 265 days.

(21) Appl. No.: 17/416,603

(22) PCT Filed: Oct. 30, 2019

(86) PCT No.: PCT/JP2019/042561
§ 371 (c)(1),
(2) Date: Jun. 21, 2021

(87) PCT Pub. No.: WO2020/137142
PCT Pub. Date: Jul. 2, 2020

(65) Prior Publication Data
US 2022/0058594 A1    Feb. 24, 2022

(30) Foreign Application Priority Data

Dec. 28, 2018 (JP) .................................. 2018-247636

(51) Int. Cl.
*G06Q 20/04* (2012.01)
*G06Q 20/14* (2012.01)
(Continued)

(52) U.S. Cl.
CPC .......... *G06Q 20/047* (2020.05); *G06Q 20/14* (2013.01); *G06Q 20/18* (2013.01); *G06Q 20/40145* (2013.01)

(58) Field of Classification Search
CPC ...... G06Q 20/047; G06Q 20/14; G06Q 20/18; G06Q 20/40145; G06Q 20/209;
(Continued)

(56) References Cited

U.S. PATENT DOCUMENTS

| 11,651,368 B2* | 5/2023 | Kcl | G06Q 20/401 |
|---|---|---|---|
| | | | 705/75 |
| 2003/0126020 A1* | 7/2003 | Smith | G06Q 30/02 |
| | | | 705/16 |

(Continued)

FOREIGN PATENT DOCUMENTS

| CA | 2571806 A1 * | 2/2006 |
|---|---|---|
| CN | 102498448 * | 6/2012 |

(Continued)

OTHER PUBLICATIONS

International Search Report for PCT Application No. PCT/JP2019/042561, mailed on Feb. 4, 2020.
(Continued)

*Primary Examiner* — Ashford S Hayles

(57) ABSTRACT

The present invention provides an electronic receipt issuing apparatus (10) including an acquisition unit (11) that acquires settlement user identification information that is input to a settlement apparatus and identifies a user of a predetermined settlement service, and settlement information indicating a settlement content in the settlement apparatus, a decision unit (12) that decides whether the settlement user identification information acquired by the acquisition unit (11) is registered in user registration information in which the settlement user identification information is registered in association with electronic receipt service-user identification information that identifies a user of an electronic receipt issuing service, and an issuing unit (13) that issues an electronic receipt, based on the settlement information, when the settlement user identification infor- (Continued)

mation acquired by the acquisition unit (11) is registered in the user registration information.

13 Claims, 14 Drawing Sheets

(51) Int. Cl.
*G06Q 20/18* (2012.01)
*G06Q 20/40* (2012.01)

(58) Field of Classification Search
CPC ......... G06Q 30/06; G07F 9/001; G07F 9/009; G07G 1/01
See application file for complete search history.

(56) References Cited

U.S. PATENT DOCUMENTS

| | | | | |
|---|---|---|---|---|
| 2005/0018883 A1* | 1/2005 | Scott | ............ | G06Q 20/382 |
| | | | | 705/64 |
| 2009/0132813 A1* | 5/2009 | Schibuk | ............ | G06Q 20/4014 |
| | | | | 726/9 |
| 2013/0073363 A1 | 3/2013 | Boal | | |
| 2013/0145444 A1* | 6/2013 | Mizoguchi | ......... | G06Q 20/3221 |
| | | | | 726/5 |
| 2013/0159090 A1* | 6/2013 | Boal | ............ | G06Q 30/0207 |
| | | | | 705/14.38 |
| 2013/0204697 A1* | 8/2013 | Boal | ............ | G06Q 10/00 |
| | | | | 705/14.51 |
| 2014/0074675 A1* | 3/2014 | Calman | ............ | G06Q 20/047 |
| | | | | 705/35 |
| 2014/0166749 A1* | 6/2014 | Argue | ............ | G06Q 20/322 |
| | | | | 700/232 |
| 2014/0195361 A1* | 7/2014 | Murphy | ............ | G06Q 20/047 |
| | | | | 705/21 |
| 2014/0249998 A1* | 9/2014 | Gotanda | ............ | G06Q 20/209 |
| | | | | 705/39 |
| 2015/0073928 A1* | 3/2015 | Arai | ............ | G06Q 20/047 |
| | | | | 705/24 |
| 2015/0348005 A1* | 12/2015 | Inagawa | ............ | G06Q 20/3224 |
| | | | | 705/44 |
| 2015/0356532 A1* | 12/2015 | Gotanda | ............ | G06Q 20/18 |
| | | | | 705/39 |
| 2015/0356538 A1* | 12/2015 | Okada | ............ | G06Q 20/209 |
| | | | | 705/17 |
| 2016/0110821 A1* | 4/2016 | Ejlersen | ............ | G06Q 20/20 |
| | | | | 705/24 |
| 2016/0328717 A1* | 11/2016 | Shaw | ............ | G06Q 20/40145 |
| 2022/0058594 A1* | 2/2022 | Hasegawa | ............ | G06Q 20/14 |

FOREIGN PATENT DOCUMENTS

| | | | | | |
|---|---|---|---|---|---|
| CN | 113519015 A | * | 10/2021 | ......... | G06K 7/10297 |
| JP | 2008134978 A | | 6/2008 | | |
| JP | 2009-122803 A | | 6/2009 | | |
| JP | 2010086022 A | | 4/2010 | | |
| JP | 2011-054106 A | | 3/2011 | | |
| JP | 2014-194732 A | | 10/2014 | | |
| JP | 2014527252 A | | 10/2014 | | |
| JP | 2015072672 A | | 4/2015 | | |
| JP | 2015-232840 A | | 12/2015 | | |
| JP | 2015232768 A | | 12/2015 | | |
| JP | 2016-095587 A | | 5/2016 | | |
| JP | 2017-162304 A | | 9/2017 | | |
| JP | 2017174142 A | | 9/2017 | | |
| WO | WO-0209005 A1 | * | 1/2002 | ............ | G06Q 20/02 |

OTHER PUBLICATIONS

JP Office Action for JP Application No. 2023-209978, mailed on Aug. 27, 2024 with English Translation.

* cited by examiner

FIG. 14

| SETTLEMENT APPARATUS ID | NAME | GROUP ID | ... |
|---|---|---|---|
| 00001385 | VENDING MACHINE IN ○○ BUILDING | 00138 | ... |
| 00001322 | TICKET-VENDING MACHINE AT ○○ STATION | 00023 | ... |
| ⋮ | ⋮ | ⋮ | ⋮ |

ELECTRONIC RECEIPT ISSUING APPARATUS, ELECTRONIC RECEIPT ISSUING METHOD AND NON-TRANSITORY STORAGE MEDIUM

This application is a National Stage Entry of PCT/JP2019/042561 filed on Oct. 30, 2019, which claims priority from Japanese Patent Application 2018-247636 filed on Dec. 28, 2018, the contents of all of which are incorporated herein by reference, in their entirety.

TECHNICAL FIELD

The present invention relates to an electronic receipt issuing apparatus, an electronic receipt issuing method, and a program.

BACKGROUND ART

PTL 1 discloses a system for issuing an electronic receipt related to a settlement content in a vending machine. Specifically, when a member code (user identification information) of an electronic receipt issuing service is transmitted from a portable terminal to a vending machine by near field communication at any timing during an operation such as inputting money and specifying a product to purchase, the vending machine generates an electronic receipt after end of sales, and transmits the electronic receipt to the portable terminal by near field communication.

RELATED DOCUMENT

Patent Document

[Patent Document 1] Japanese Patent Application Publication No. 2015-72672

DISCLOSURE OF THE INVENTION

Technical Problem

In a case of the technique disclosed in PTL 1, a customer (for example, a customer who does not bring a terminal that stores a member code) who does not bring a member code of an electronic receipt issuing service cannot issue an electronic receipt at a time of settlement by a vending machine.

A problem to be solved by the present invention is to issue an electronic receipt indicating a settlement content in a settlement apparatus even when information for issuing the electronic receipt is not brought.

Solution to Problem

The present invention provides an electronic receipt issuing apparatus including, an acquisition unit acquiring settlement user identification information that is input to a settlement apparatus and identifies a user of a predetermined settlement service, and settlement information indicating a settlement content in the settlement apparatus,
  a decision unit deciding whether the settlement user identification information acquired by the acquisition unit is registered in user registration information in which the settlement user identification information is registered in association with electronic receipt service-user identification information that identifies a user of an electronic receipt issuing service, and
  an issuing unit issuing an electronic receipt, based on the settlement information, when the settlement user identification information acquired by the acquisition unit is registered in the user registration information.

Further, the present invention provides an electronic receipt issuing method executed by a computer, the method including,
  an acquisition step of acquiring settlement user identification information that is input to a settlement apparatus and identifies a user of a predetermined settlement service, and settlement information indicating a settlement content in the settlement apparatus;
  a decision step of deciding whether the settlement user identification information acquired in the acquisition step is registered in user registration information in which the settlement user identification information is registered in association with electronic receipt service-user identification information that identifies a user of an electronic receipt issuing service; and
  an issuing step of issuing an electronic receipt, based on the settlement information, when the settlement user identification information acquired in the acquisition step is registered in the user registration information.

Further, the present invention provides a program causing a computer to function as,
  an acquisition unit acquiring settlement user identification information that is input to a settlement apparatus and identifies a user of a predetermined settlement service, and settlement information indicating a settlement content in the settlement apparatus,
  a decision unit deciding whether the settlement user identification information acquired by the acquisition unit is registered in user registration information in which the settlement user identification information is registered in association with electronic receipt service-user identification information that identifies a user of an electronic receipt issuing service, and
  an issuing unit issuing an electronic receipt, based on the settlement information, when the settlement user identification information acquired by the acquisition unit is registered in the user registration information.

Advantageous Effects of Invention

According to the present invention, in settlement by the settlement apparatus, an electronic receipt indicating a settlement content in a settlement apparatus becomes able to be issued even when user identification information of an electronic receipt issuing service is not brought.

BRIEF DESCRIPTION OF THE DRAWINGS

The above-described object, the other objects, features, and advantages will become more apparent from suitable example embodiments described below and the following accompanying drawings.

FIG. 14 is a diagram schematically illustrating one example of information processed by the electronic receipt issuing apparatus according to the present example embodiment.

DESCRIPTION OF EMBODIMENTS

First Example Embodiment

Figure 1:
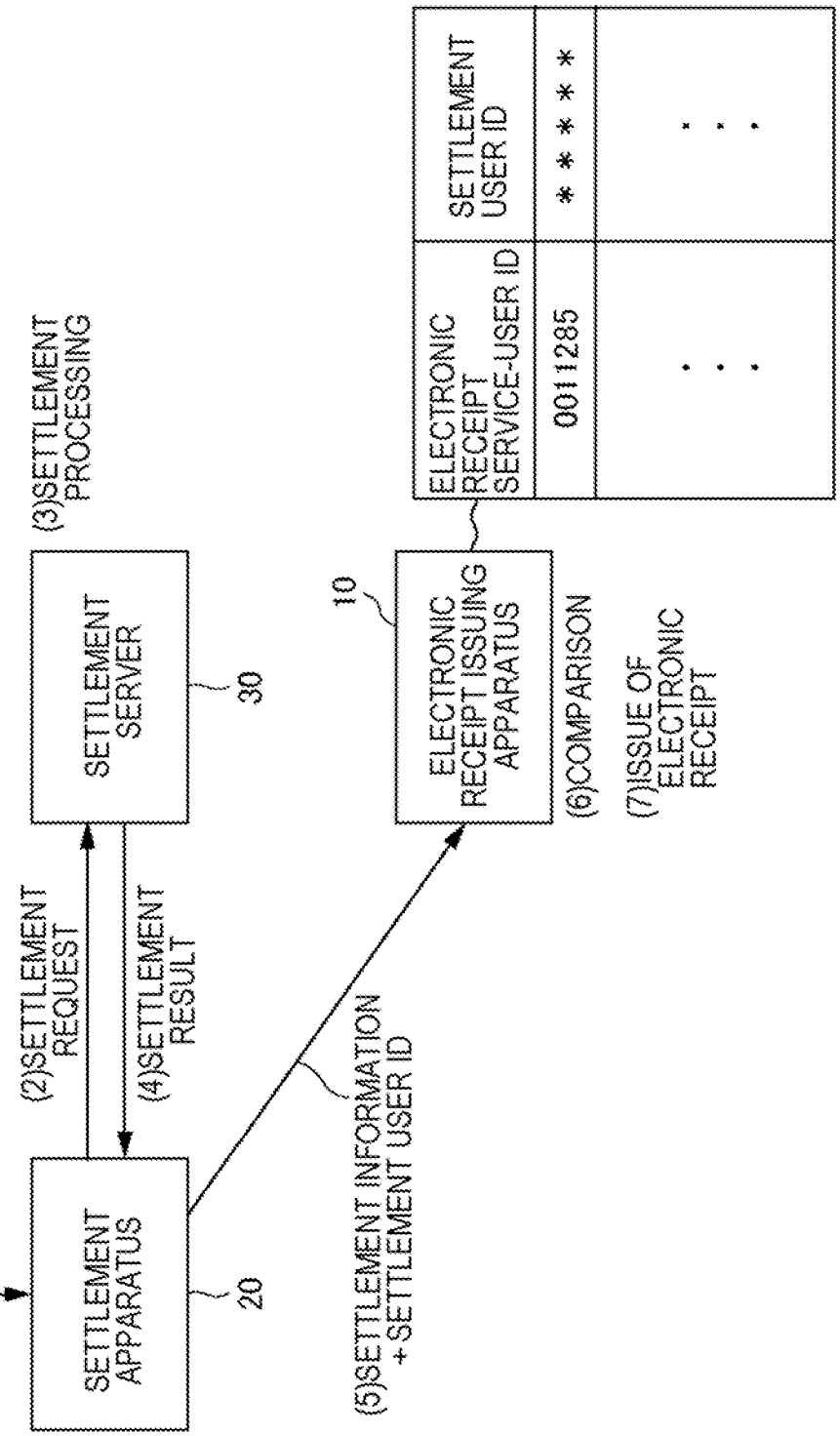
FIG. 1 is one example of a functional block diagram of an electronic receipt issuing system according to a present example embodiment.

First, an overall perspective and an overview of an electronic receipt issuing system according to a present example embodiment will be described by using a functional block diagram in FIG. 1.

The electronic receipt issuing system according to the present example embodiment includes an electronic receipt issuing apparatus 10, a settlement apparatus 20, and a settlement server 30.

The settlement apparatus 20 is an apparatus that performs settlement and the like, and is, for example, a vending machine, a ticket-vending machine, an automated payment machine installed in a parking lot or a bicycle parking lot, a settlement apparatus for a locker and at an automated store, a POS apparatus, and a settlement apparatus in a semi-self POS system installed in such a way that a registration apparatus that performs product registration and a settlement apparatus that performs settlement of a registered product are separated. The settlement apparatus 20 according to the present example embodiment may be any settlement apparatus as long as the settlement apparatus includes an input function for electronically settling a payment amount, such as a credit card, electronic money, and code settlement.

The settlement server 30 performs settlement processing in response to a settlement request from an external apparatus. The settlement server 30 is a server that performs processing of electronically performing settlement of a payment amount. For example, the settlement server 30 may be a server that provides a settlement service by a credit card, may be a server that provides a settlement service by electronic money, and may be a server that provides a code settlement service.

The electronic receipt issuing apparatus 10 provides an electronic receipt issuing service that issues an electronic receipt, based on settlement information received from an external apparatus, and stores the issued electronic receipt in association with user identification information. In other words, when user identification information of the service and information related to a product purchased at a store and the like are input to the electronic receipt issuing apparatus 10, the electronic receipt issuing apparatus 10 generates an electronic receipt, based on the information related to the product purchased at the store and the like, and stores the generated electronic receipt in association with the input user identification information in a storage unit included in the electronic receipt issuing apparatus 10. A user can log in to the electronic receipt issuing apparatus 10 by operating a predetermined terminal, and display his/her own electronic receipt on the terminal. Note that, the electronic receipt issuing system according to the present example embodiment can issue an electronic receipt by using user identification information of the settlement service described above even when a user does not bring user identification information of the service at a time of shopping at a store and the like. Hereinafter, user identification information of an electronic receipt issuing service is referred to as "electronic receipt service-user identification information".

A flow of processing of the electronic receipt issuing system is as follows.

(1) Settlement content determination information that determines a settlement content is input to the settlement apparatus 20 via an input apparatus included in the settlement apparatus 20. Further, settlement service related information being information used for settlement in a predetermined settlement service is input to the settlement apparatus 20 via the input apparatus included in the settlement apparatus 20.

A physical button, a touch panel, a reader (such as a magnetic card reader, a near field communication (NFC) reader, and a code reader), a microphone, a camera, and the like are exemplified as the input apparatus, which is not limited thereto.

The settlement content determination information is, for example, information that identifies a product, a service, a ticket, and the like that are determined by the input apparatus and are to be purchased. In addition, the settlement content determination information may be information that identifies a parking area, a bicycle parking area, a locker, and the like to be used or being used.

As the settlement service related information, information (such as a credit card number, a card nominal person, an expiration date, and a security code) for settlement by a credit card, information (such as user identification information of an electronic money settlement service) for settlement by electronic money, information (such as user identification information of a code settlement service) for code settlement, and the like are exemplified.

(2) The settlement apparatus 20 computes a settlement amount, based on the settlement content determination information input in (1). Then, the settlement apparatus 20 transmits, to the predetermined settlement server 30, a settlement request including the computed settlement amount and the settlement service related information input in (1). The settlement apparatus 20 determines the settlement server 30 associated with a settlement service using the settlement service related information, based on the settlement service related information input in (1), and transmits a settlement request to the determined settlement server 30.

(3) The settlement server 30 performs settlement processing of a settlement amount in response to the settlement request.

(4) The settlement server 30 transmits a settlement result to the settlement apparatus 20.

(5) When the settlement result indicates success, the settlement apparatus 20 transmits at least a part of the settlement service related information and settlement information indicating a settlement content to the electronic receipt issuing apparatus 10.

The at least a part of the settlement service related information includes settlement user identification information being information that identifies a user of a settlement service. As the settlement user identification information, a credit card number, user identification information of an electronic money settlement service, user identification information of a code settlement service, and the like are exemplified, which is not limited thereto. Note that, in the drawings, "user identification information" is expressed as "user identifier (ID)".

The settlement information can include information (for example: a purchased product name, a purchased service name, a service name to be used or being used, and a content of a purchased ticket) that determines a settlement content, a settlement amount, settlement date and time, a settlement method, information that identifies the settlement apparatus 20 that performs settlement, and the like.

Further, when a settlement result indicates success, the settlement apparatus 20 discharges a product and a ticket, releases a lock of a parking area and a parking bicycle area, opens a gate of a parking lot, locks a locker, and releases a lock of a locker.

Note that, when a settlement result indicates failure, the settlement apparatus 20 notifies a customer that a settlement is in failure. For example, the settlement apparatus 20 outputs information indicating that a settlement is in failure via an output apparatus such as a display and a speaker.

(6) The electronic receipt issuing apparatus 10 includes a storage unit, and stores electronic receipt service-user identification information and settlement user identification information in association with each other. Then, the electronic receipt issuing apparatus 10 performs comparison processing of checking whether the settlement user identification information received in (5) is registered.

(7) When the settlement user identification information received in (5) is registered, the electronic receipt issuing apparatus 10 issues an electronic receipt, based on the settlement information received in (5). Then, the electronic receipt issuing apparatus 10 stores the issued electronic receipt in association with electronic receipt service-user identification information associated with the settlement user identification information received in (5), and transmits the issued electronic receipt to a notification destination registered in association with the electronic receipt service-user identification information.

Next, a configuration of the apparatus included in the electronic receipt issuing system according to the present example embodiment will be described in detail. First, one example of a hardware configuration of the electronic receipt issuing apparatus 10, the settlement apparatus 20, and the settlement server 30 will be described. Each functional unit included in the electronic receipt issuing apparatus 10, the settlement apparatus 20, and the settlement server 30 according to the present example embodiment is achieved by any combination of hardware and software concentrating on a central processing unit (CPU) of any computer, a memory, a program loaded into the memory, a storage unit (that can also store a program downloaded from a storage medium such as a compact disc (CD), a server on the Internet, and the like, in addition to a program previously stored at a stage of shipping of an apparatus) such as a hard disk that stores the program, and a network connection interface. Then, various modification examples of an achievement method and an apparatus thereof are understood by a person skilled in the art.

Figure 2:
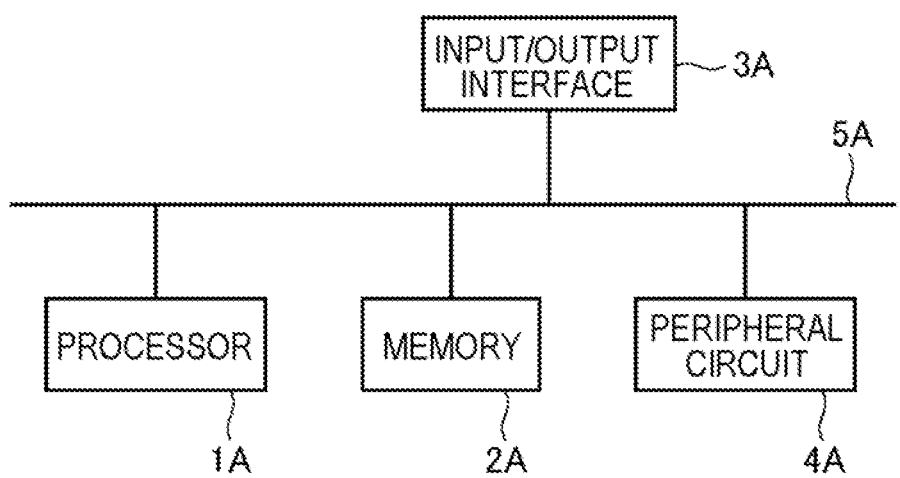
FIG. 2 is a diagram illustrating one example of a hardware configuration of an electronic receipt issuing apparatus according to the present example embodiment.

FIG. 2 is a block diagram illustrating a hardware configuration of each of the electronic receipt issuing apparatus 10, the settlement apparatus 20, and the settlement server 30 according to the present example embodiment. As illustrated in FIG. 2, each of the electronic receipt issuing apparatus 10, the settlement apparatus 20, and the settlement server 30 includes a processor 1A, a memory 2A, an input/output interface 3A, a peripheral circuit 4A, and a bus 5A. Various modules are included in the peripheral circuit 4A. The electronic receipt issuing apparatus 10, the settlement apparatus 20, and the settlement server 30 may not include the peripheral circuit 4A. Note that, the electronic receipt issuing apparatus 10, the settlement apparatus 20, and the settlement server 30 may be formed of a plurality of apparatuses being separated physically and/or logically. In this case, each of the plurality of apparatuses can include the hardware configuration described above.

The bus 5A is a data transmission path for the processor 1A, the memory 2A, the peripheral circuit 4A, and the input/output interface 3A to transmit and receive data to and from each other. The processor 1A is an arithmetic processing apparatus such as a CPU and a graphics processing unit (GPU), for example. The memory 2A is a memory such as a random access memory (RAM) and a read only memory (ROM), for example. The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, and the like. The output apparatus is, for example, a display, a speaker, a printer, a mailer, and the like. The processor 1A can output an instruction to each of modules, and perform an arithmetic operation, based on an arithmetic result of the modules.

Figure 3:
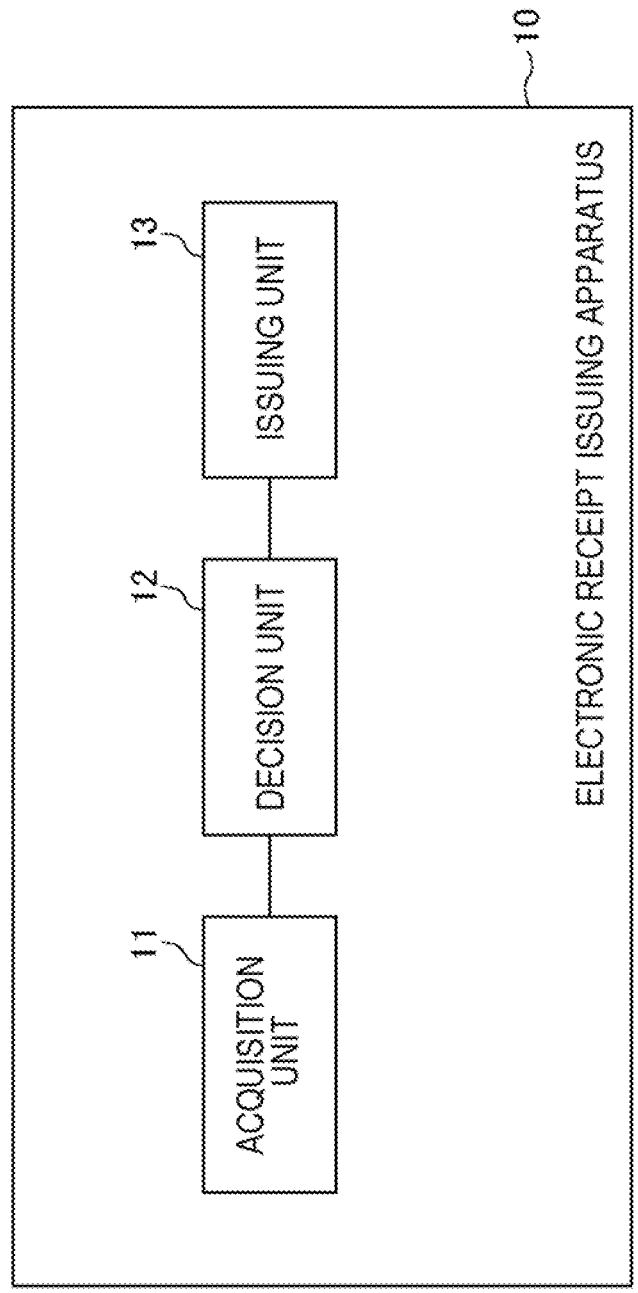
FIG. 3 is one example of a functional block diagram of the electronic receipt issuing apparatus according to the present example embodiment.

Next, one example of a functional configuration of the electronic receipt issuing apparatus 10 will be described. As illustrated in a functional block diagram in FIG. 3, the electronic receipt issuing apparatus 10 includes an acquisition unit 11, a decision unit 12, and an issuing unit 13.

The acquisition unit 11 acquires, from an external apparatus such as the settlement apparatus 20, settlement user identification information input to the settlement apparatus 20, and settlement information indicating a settlement content in the settlement apparatus 20. Details of the settlement user identification information and the settlement information are as described above.

The decision unit 12 decides whether the settlement user identification information acquired by the acquisition unit 11 is registered in first user registration information in which the settlement user identification information is registered in association with electronic receipt service-user identification information. The first user registration information is stored in the storage unit included in the electronic receipt issuing apparatus 10. One example of the first user registration information is illustrated in FIG. 1.

Herein, one example of a flow of processing until the first user registration information is registered in the electronic receipt issuing apparatus 10 will be described.

As one example, a user who requests use of an electronic receipt issuing service performs a new registration for starting use of the electronic receipt issuing service via a predetermined website and a predetermined application. For example, a user inputs a necessary requirement such as a his/her own name, age, and a nickname, and inputs a request for a new registration. When the electronic receipt issuing apparatus 10 receives the request for a new registration, the electronic receipt issuing apparatus 10 newly generates electronic receipt service user identification information, and stores, in the storage unit included in the electronic receipt issuing apparatus 10, the electronic receipt service user identification information in association with the input requirement described above and the like.

At a time of the new registration described above, a user may perform an operation of registering the settlement service related information described above including settlement user identification information (such as a credit card number, user identification information of an electronic money settlement service, and user identification information of a code settlement service), and his/her own biometric information (such as a face picture). In addition, after the new registration described above, a user may perform an operation of registering the settlement service related information and his/her own biometric information on a user setting screen and the like. When the electronic receipt issuing apparatus 10 acquires the settlement service related information and the biometric information being input by the operation, the electronic receipt issuing apparatus 10 stores, in the storage unit included in the electronic receipt issuing apparatus 10, the settlement service related information and the biometric information in association with electronic receipt service user identification information of the user. Note that, at a time of the new registration described above or after the new registration described above, a user may register, via the user setting screen, a notification destination (for example: an e-mail address and a social networking service (SNS) account) for receiving various notifications from the electronic receipt issuing apparatus 10. When the electronic receipt issuing apparatus 10 acquires the input notification destination, the electronic receipt issuing apparatus 10 stores, in the storage unit included in the electronic receipt issuing apparatus 10, the notification destination in association with electronic receipt service user identification information of the user.

As another example, when both of electronic receipt service user identification information and settlement service related information including settlement user identification information are input to the settlement apparatus 20 at a time of settlement, the settlement apparatus 20 may transmit, to the electronic receipt issuing apparatus 10, the electronic receipt service user identification information and the settlement service related information being input. Then, the electronic receipt issuing apparatus 10 may store, in the storage unit included in the electronic receipt issuing apparatus 10, the received settlement service related information in association with the received electronic receipt service user identification information. For example, the electronic receipt service user identification information may be input to the settlement apparatus 20 in order to issue an electronic receipt, and the settlement service related information may also be input to the settlement apparatus 20 in order to perform settlement by using a predetermined settlement service.

Note that, when both of the electronic receipt service user identification information and the settlement service related information are input to the settlement apparatus 20 at a time of settlement, the settlement apparatus 20 may display, on a display, information that inquires about whether to register the input settlement service related information in the electronic receipt issuing apparatus 10. Then, the settlement apparatus 20 may receive a user input indicating a response to the inquiry via any input apparatus such as a touch panel display, a physical button, and a microphone. Then, when the response to the inquiry indicates "registration", the settlement apparatus 20 may transmit, to the electronic receipt issuing apparatus 10, the electronic receipt service user identification information and the settlement service related information being input. Then, the electronic receipt issuing apparatus 10 may store, in the storage unit included in the electronic receipt issuing apparatus 10, the received settlement service related information in association with the received electronic receipt service user identification information.

When the settlement user identification information acquired by the acquisition unit 11 is registered in the first user registration information, the issuing unit 13 issues an electronic receipt, based on the settlement information acquired by the acquisition unit 11. The electronic receipt can include information (for example: a purchased product name, a purchased service name, a service name to be used or being used, and a content of a purchased ticket) that determines a settlement content, a settlement amount, settlement date and time, a settlement method, information that identifies the settlement apparatus 20 that performs settlement, and the like. The information that identifies the settlement apparatus 20 may be a name and the like in which an installation position and a kind of the settlement apparatus 20 can be recognized, such as "vending machine in ∘∘ building" and "xx park front shop at ∘∘ store".

The issuing unit 13 can store, in the storage unit included in the electronic receipt issuing apparatus 10, the issued electronic receipt in association with the electronic receipt service-user identification information associated with the settlement user identification information acquired by the acquisition unit 11. Further, the issuing unit 13 can transmit the issued electronic receipt to a notification destination (for example: an e-mail address and an SNS account) registered in association with the electronic receipt service-user identification information.

Figure 4:
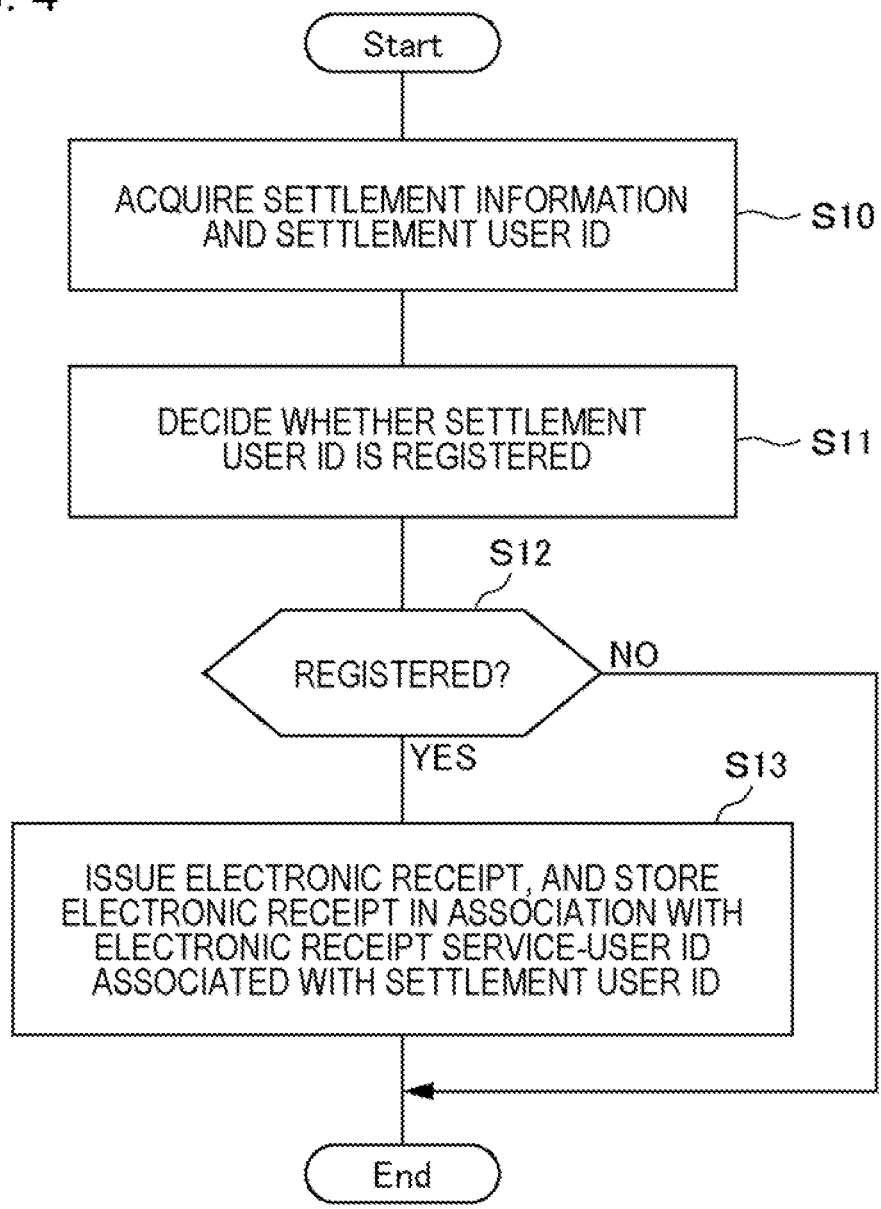
FIG. 4 is a flowchart illustrating one example of a flow of processing of the electronic receipt issuing apparatus according to the present example embodiment.

Next, one example of a flow of processing of the electronic receipt issuing apparatus 10 will be described by using a flowchart in FIG. 4.

First, the electronic receipt issuing apparatus 10 acquires settlement user identification information input to the settlement apparatus 20 for settlement, and settlement information indicating a settlement content in the settlement apparatus 20 (S10).

Next, the electronic receipt issuing apparatus 10 decides whether the settlement user identification information acquired in S10 is registered in first user registration information in which the settlement user identification information is registered in association with electronic receipt service-user identification information (S11).

When the settlement user identification information is registered (Yes in S12), the electronic receipt issuing apparatus 10 issues an electronic receipt, based on the settlement information acquired in S10, stores, in the storage unit included in the electronic receipt issuing apparatus 10, the issued electronic receipt in association with the electronic receipt service-user identification information associated with the settlement user identification information acquired in S10 (S13), and then ends the processing.

On the other hand, when the settlement user identification information is not registered (No in S12), the processing apparatus 10 ends the processing without issuing the electronic receipt.

The electronic receipt issuing apparatus 10 according to the present example embodiment described above can issue an electronic receipt indicating a settlement content in the settlement apparatus 20 even when a customer does not bring electronic receipt service-user identification information in settlement by the settlement apparatus 20.

Further, the electronic receipt issuing apparatus 10 according to the present example embodiment can determine the electronic receipt service-user identification information of the customer by using settlement service related information. Since the settlement service related information is necessary information for settlement by the settlement apparatus 20, inconvenience that the customer forgets to bring the settlement service related information at a time of settlement by the settlement apparatus 20 is less likely to occur. Thus, the electronic receipt issuing apparatus 10 according to the present example embodiment can suppress occurrence of inconvenience that an electronic receipt cannot be issued due to certain information forgotten to be brought at a time of settlement by the settlement apparatus 20.

Herein, a modification example will be described. In the example described by using FIG. 1, in the processing in (2), the settlement apparatus 20 transmits a settlement request to the settlement server 30, but, in a case of code settlement, a communication terminal (for example: a smartphone, a tablet terminal, and a cellular phone) of a customer may transmit a settlement request to the settlement server 30. In this case, the communication terminal of a customer reads a code output from the settlement apparatus 20, and thus the communication terminal of the customer acquires information that determines a settlement content, a settlement amount, information that identifies the settlement apparatus 20, and the like. Then, the communication terminal of the customer transmits a settlement request including the acquired pieces of information to the settlement server 30.

In a case of the modification example, the settlement server 30 can transmit a settlement result to both of the settlement apparatus 20 and a communication terminal of a customer in the processing in (4). Then, the processing in (5) of transmitting settlement information and settlement user identification information to the electronic receipt issuing apparatus 10 may be performed by the settlement apparatus 20 and may be performed by the communication terminal of the customer.

As another modification example, instead of the settlement apparatus 20, the settlement server 30 may perform the processing in (5) of transmitting settlement information and settlement user identification information to the electronic receipt issuing apparatus 10. In this case, the settlement server 30 can acquire the settlement information from the settlement apparatus 20 and a communication terminal of a customer.

As another modification example, for example, in the settlement apparatus 20 that performs settlement related to a product and a service having an age restriction, such as a cigarette and alcoholic beverages, information (for example: member identification information provided to a customer who satisfies an age condition) for performing an age confirmation is input to the settlement apparatus 20. The settlement apparatus 20 may transmit settlement information and the above-described member identification information to the electronic receipt issuing apparatus 10.

In a case of the modification example, the electronic receipt issuing apparatus 10 stores electronic receipt service-user identification information and the above-described member identification information in association with each other. Then, the electronic receipt issuing apparatus 10 can determine the electronic receipt service-user identification information of a customer who performs settlement by the settlement apparatus 20 by comparing the stored information with the above-described member identification information received from the settlement apparatus 20.

Another modification example will be described. In the example described by using FIG. 1, the settlement apparatus 20 computes a settlement amount, based on settlement content determination information. As the modification example, the settlement server 30 may compute a settlement amount. In this case, the settlement apparatus 20 transmits settlement content determination information to the settlement server 30. Then, the settlement server 30 computes a settlement amount, based on the received settlement content determination information.

Second Example Embodiment

Figure 5:
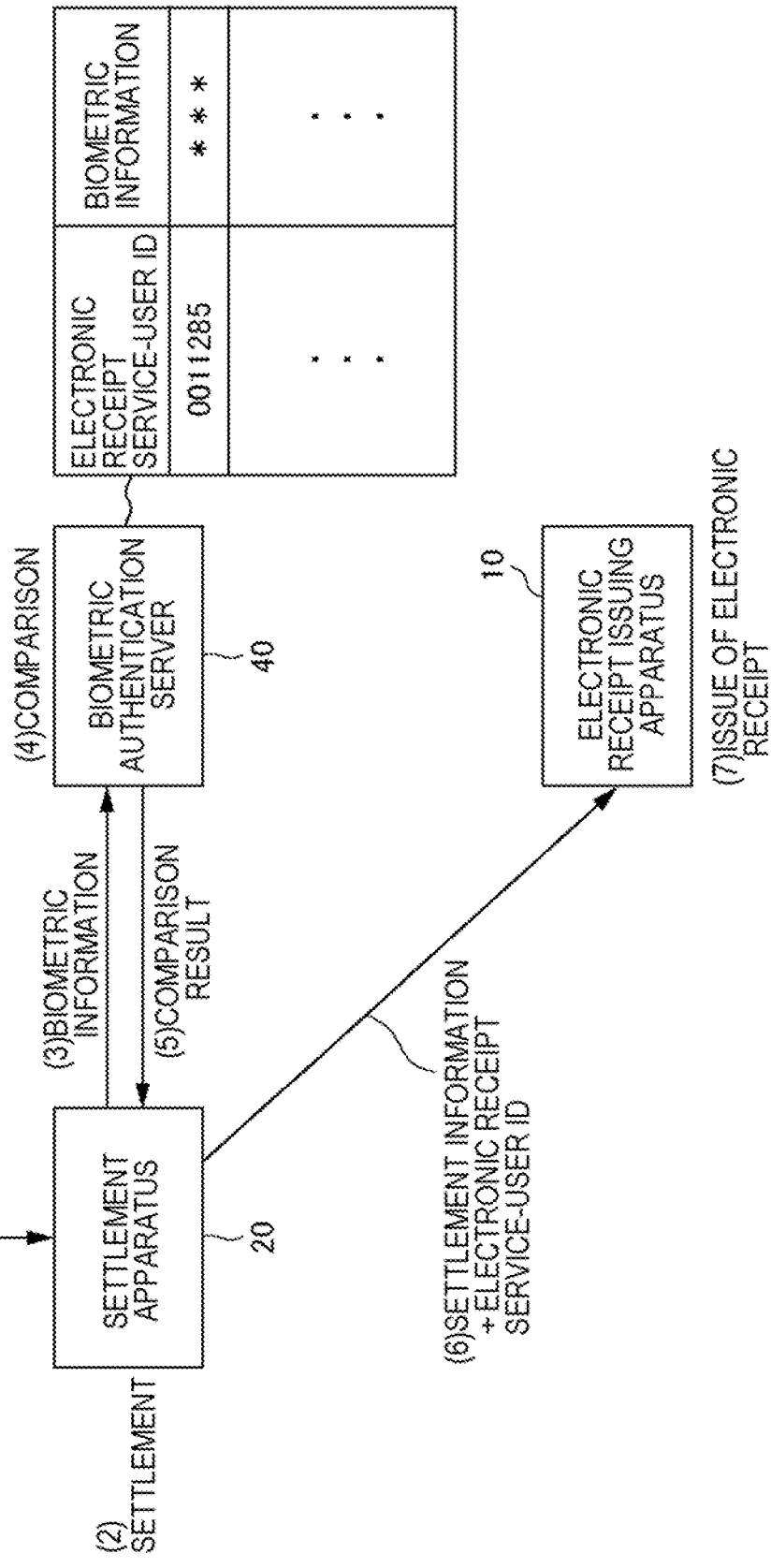
FIG. 5 is one example of a functional block diagram of the electronic receipt issuing system according to the present example embodiment.

First, an overall perspective and an overview of an electronic receipt issuing system according to a present example embodiment will be described by using a functional block diagram in FIG. 5.

The electronic receipt issuing system according to the present example embodiment includes an electronic receipt issuing apparatus 10, a settlement apparatus 20, and a biometric authentication server 40.

The settlement apparatus 20 is an apparatus that performs settlement and the like, and is, for example, a vending machine, a ticket-vending machine, an automated payment machine installed in a parking lot or a bicycle parking lot, a settlement apparatus for a locker and at an automated store, a POS apparatus, and a settlement apparatus in a semi-self POS system installed in such a way that a registration apparatus that performs product registration and a settlement apparatus that performs settlement of a registered product are separated. The settlement apparatus 20 according to the present example embodiment may be any settlement apparatus as long as the settlement apparatus includes an input function for electronically settling a payment amount, such as a credit card, electronic money, and code settlement.

The biometric authentication server 40 includes a storage unit, and stores second user registration information in which electronic receipt service-user identification information and biometric information about each user are associated with each other. As the biometric information, a fingerprint, an iris, a face image, a voiceprint, a feature value of the fingerprint, the iris, the face image, and the voiceprint, and the like are exemplified, which is not limited thereto. Then, the biometric authentication server 40 performs biometric authentication, based on biometric information and an authentication request being received from an external apparatus, and returns a result of the biometric authentication.

The electronic receipt issuing apparatus 10 provides an electronic receipt issuing service that issues an electronic receipt, based on settlement information received from an external apparatus, and stores the issued electronic receipt in association with electronic receipt service-user identification information. In other words, when user identification information of the service and information related to a product purchased at a store and the like are input to the electronic receipt issuing apparatus 10, the electronic receipt issuing apparatus 10 generates an electronic receipt, based on the information related to the product purchased at the store and the like, and stores the generated electronic receipt in association with the input user identification information in a storage unit included in the electronic receipt issuing apparatus 10. A user can log in to the electronic receipt issuing apparatus 10 by operating a predetermined terminal, and display his/her own electronic receipt on the terminal. Note that, the electronic receipt issuing system according to the present example embodiment can issue an electronic receipt by using biometric information even when a user does not bring user identification information of the service at a time of shopping at a store and the like.

A flow of processing of the electronic receipt issuing system is as follows.

(1) Settlement content determination information that determines a settlement content is input to the settlement apparatus 20 via an input apparatus included in the settlement apparatus 20. The processing is as described in the first example embodiment.

Further, cash, settlement service related information, and the like are input to the settlement apparatus 20 via the input apparatus included in the settlement apparatus 20. The settlement service related information is as described in the first example embodiment.

Further, biometric information is input to the settlement apparatus 20 via the input apparatus included in the settlement apparatus 20. The input apparatus exemplified above may be used, and another apparatus that achieves an input of biometric information, such as a fingerprint sensor, may be used.

(2) The settlement apparatus 20 computes a settlement amount, based on the settlement content determination information input in (1). Then, the settlement apparatus 20 performs settlement of the computed settlement amount, based on the computed settlement amount, and the cash and the settlement service related information being input in (1). Then, the settlement apparatus 20 discharges a product and a ticket, releases a lock of a parking area and a parking bicycle area, opens a gate of a parking lot, locks a locker, and releases a lock of a locker.

(3) The settlement apparatus 20 transmits, to the biometric authentication server 40, the biometric information and the authentication request being input in (1).

(4) The biometric authentication server 40 performs biometric authentication that compares the biometric information acquired in (3) and the second user registration information.

(5) The biometric authentication server 40 returns a result (comparison result) of the biometric authentication to the settlement apparatus 20. The result of the biometric authentication is an authentication success or an authentication failure. In a case of the authentication success, the result of the biometric authentication transmitted from the biometric authentication server 40 to the settlement apparatus 20 includes electronic receipt service-user identification information associated with the biometric information acquired in (3).

Note that, a processing order of (1) to (5) described herein is merely one example, which is not limited thereto.

(6) When the settlement apparatus 20 completes the settlement in (2) and receives the result of the biometric authentication indicating an authentication success in (5), the settlement apparatus 20 transmits electronic receipt service-user identification information included in the result of the biometric authentication and settlement information indicating a settlement content to the electronic receipt issuing apparatus 10. The settlement information is as described in the first example embodiment.

(7) The electronic receipt issuing apparatus 10 issues an electronic receipt, based on the settlement information received in (6). Then, the electronic receipt issuing apparatus 10 stores the issued electronic receipt in association with the electronic receipt service-user identification information received in (6), and transmits the issued electronic receipt to a notification destination registered in association with the electronic receipt service-user identification information.

Note that, when the result of the biometric authentication transmitted and received in (5) indicates failure, the settlement apparatus 20 does not perform the processing in (6), and the electronic receipt issuing apparatus 10 does not perform the processing in (7).

Next, a configuration of the apparatus included in the electronic receipt issuing system according to the present example embodiment will be described in detail. One example of a hardware configuration of each of the electronic receipt issuing apparatus 10, the settlement apparatus 20, and the biometric authentication server 40 is similar to that in the first example embodiment.

Figure 6:
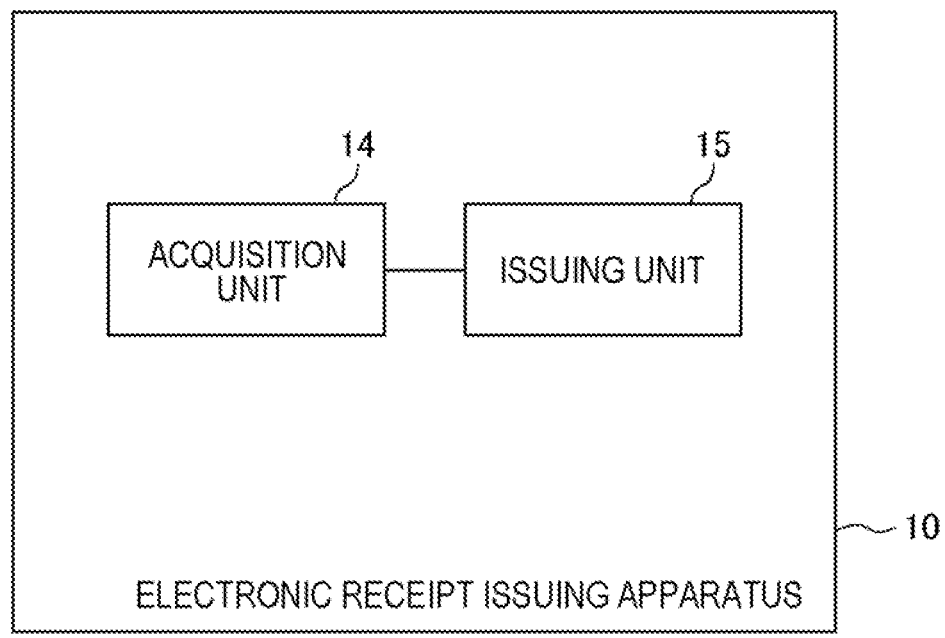
FIG. 6 is one example of a functional block diagram of the electronic receipt issuing apparatus according to the present example embodiment.

Next, one example of a functional configuration of the electronic receipt issuing apparatus 10 will be described. As illustrated in a functional block diagram in FIG. 6, the electronic receipt issuing apparatus 10 includes an acquisition unit 14 and an issuing unit 15.

The acquisition unit 14 acquires electronic receipt service-user identification information determined by biometric authentication using biometric information input to the settlement apparatus 20, and settlement information indicating a settlement content in the settlement apparatus 20. As described above, the biometric authentication server 40 receives the biometric information input to the settlement apparatus 20, performs biometric authentication, and transmits a result of the biometric authentication to the settlement apparatus 20. When the result of the biometric authentication indicates success, the settlement apparatus 20 transmits electronic receipt service-user identification information included in the result of the biometric authentication and settlement information to the electronic receipt issuing apparatus 10. When the result of the biometric authentication indicates failure, the settlement apparatus 20 may not transmit settlement information to the electronic receipt issuing apparatus 10. The settlement information is as described in the first example embodiment.

When a result of biometric authentication using biometric information input to the settlement apparatus 20 indicates success, that is, when the acquisition unit 14 acquires electronic receipt service-user identification information, the issuing unit 15 issues an electronic receipt, based on settlement information acquired by the acquisition unit 14. The electronic receipt can include information (for example: a purchased product name, a purchased service name, a service name to be used or being used, and a content of a purchased ticket) that determines a settlement content, a settlement amount, settlement date and time, a settlement method, information that identifies the settlement apparatus 20 that performs settlement, and the like.

The issuing unit 15 can store, in the storage unit included in the electronic receipt issuing apparatus 10, the issued electronic receipt in association with the electronic receipt service-user identification information acquired by the acquisition unit 14. Further, the issuing unit 15 can transmit the issued electronic receipt to a notification destination (for example: an e-mail address and an SNS account) registered in association with the electronic receipt service-user identification information.

Figure 7:
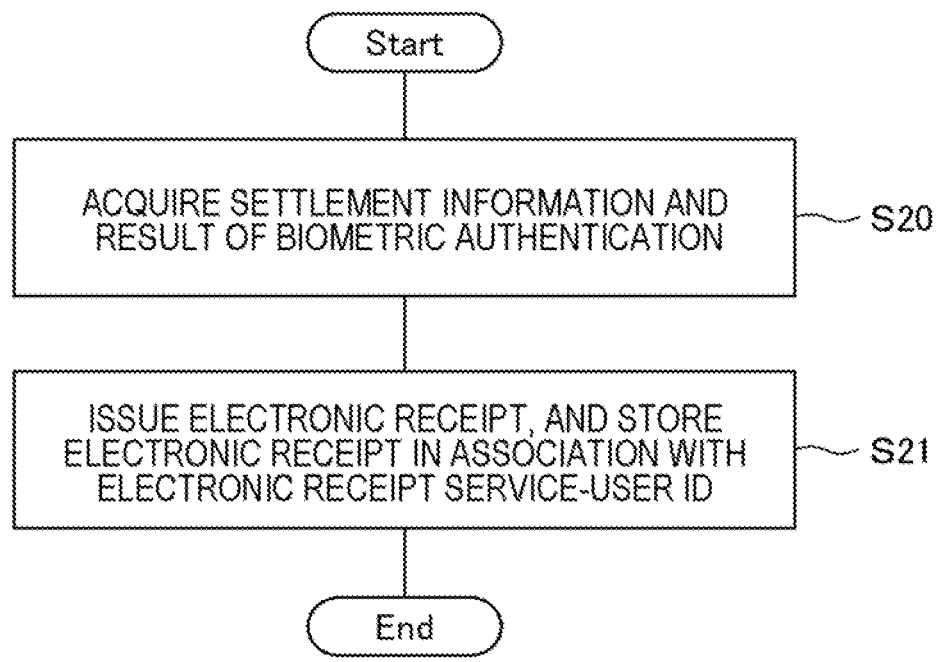
FIG. 7 is a flowchart illustrating one example of a flow of processing of the electronic receipt issuing apparatus according to the present example embodiment.

Next, one example of a flow of processing of the electronic receipt issuing apparatus 10 will be described by using a flowchart in FIG. 7.

First, the electronic receipt issuing apparatus 10 acquires electronic receipt service-user identification information determined by biometric authentication using biometric information input to the settlement apparatus 20, and settlement information indicating a settlement content in the settlement apparatus 20 (S20). Next, when the electronic receipt service-user identification information is acquired in S20, the electronic receipt issuing apparatus 10 issues an electronic receipt, based on the settlement information acquired in S20, stores, in the storage unit included in the electronic receipt issuing apparatus 10, the issued electronic receipt in association with the electronic receipt service-user identification information acquired in S20 (S21), and then ends the processing.

The electronic receipt issuing apparatus 10 according to the present example embodiment described above can issue an electronic receipt indicating a settlement content in the settlement apparatus 20 even when a customer does not bring electronic receipt service-user identification information in settlement by the settlement apparatus 20.

Further, the electronic receipt issuing apparatus 10 according to the present example embodiment can determine the electronic receipt service-user identification information of a customer by using biometric information about the customer. Thus, the electronic receipt issuing apparatus 10 according to the present example embodiment can suppress occurrence of inconvenience that an electronic receipt cannot be issued due to certain information forgotten to be brought at a time of settlement by the settlement apparatus 20.

Herein, a modification example will be described. In the present example embodiment, the settlement apparatus 20 generates settlement information, the biometric authentication server 40 determines electronic receipt service-user identification information by biometric authentication, and the settlement information and the electronic receipt service-user identification information are input to the electronic receipt issuing apparatus 10, but there are various paths thereof, which is not limited to the example described by using FIG. 5.

For example, the settlement apparatus 20 may transmit biometric information and settlement information to the biometric authentication server 40. Then, when biometric authentication is successful, the biometric authentication server 40 may transmit electronic receipt service-user identification information being determined by the biometric authentication and settlement information to the electronic receipt issuing apparatus 10. Note that, when biometric authentication is in failure, the biometric authentication server 40 may not transmit settlement information to the electronic receipt issuing apparatus 10.

As another example, the settlement apparatus 20 may transmit settlement information provided with predetermined processing identification information to the electronic receipt issuing apparatus 10, and may also transmit biometric information provided with the same processing identification information to the biometric authentication server 40. Then, the biometric authentication server 40 may transmit a result of biometric authentication provided with the same processing identification information to the electronic receipt issuing apparatus 10.

Third Example Embodiment

Figure 8:
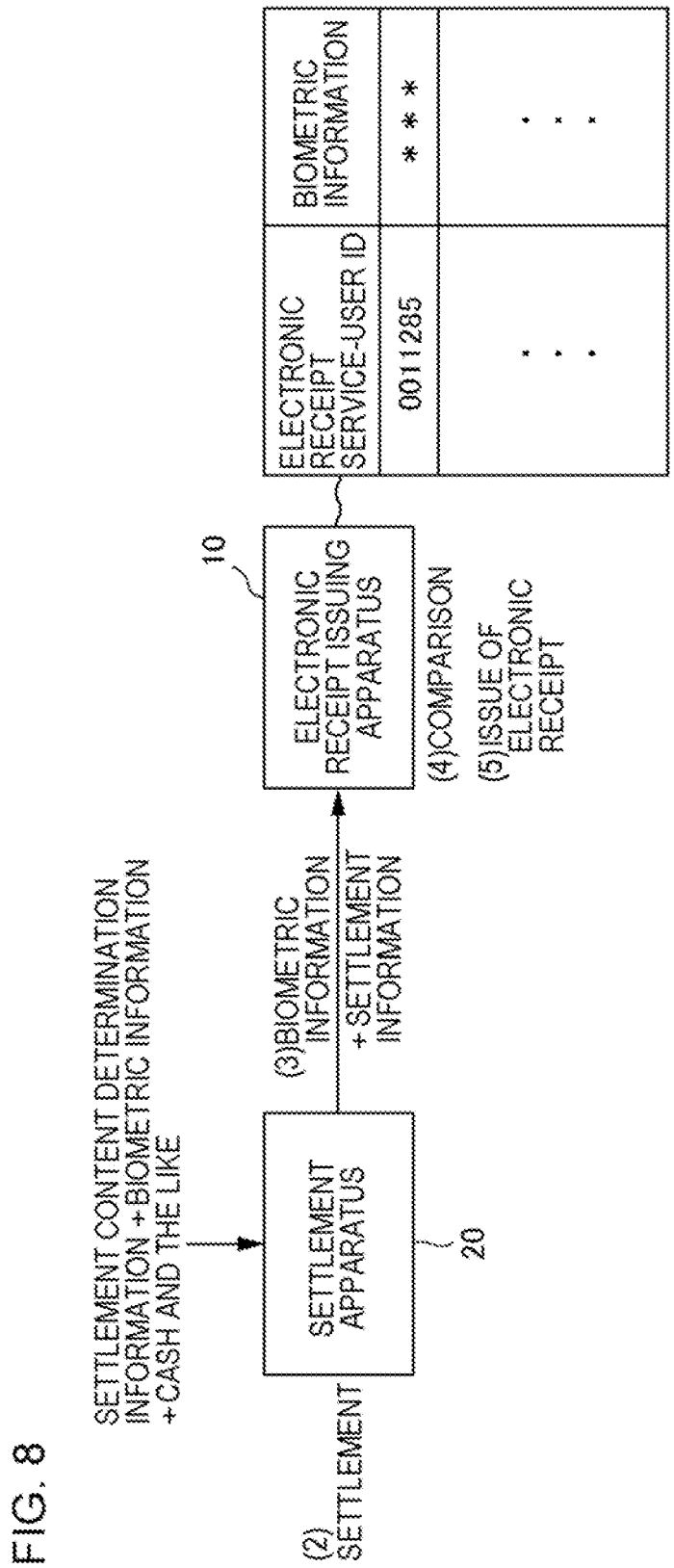
FIG. 8 is one example of a functional block diagram of the electronic receipt issuing system according to the present example embodiment.

First, an overall perspective and an overview of an electronic receipt issuing system according to a present example embodiment will be described by using a functional block diagram in FIG. 8.

The electronic receipt issuing system according to the present example embodiment includes an electronic receipt issuing apparatus 10 and a settlement apparatus 20.

The settlement apparatus 20 is an apparatus that performs settlement and the like, and is, for example, a vending machine, a ticket-vending machine, an automated payment machine installed in a parking lot or a bicycle parking lot, a settlement apparatus for a locker and at an automated store, a POS apparatus, and a settlement apparatus in a semi-self POS system installed in such a way that a registration apparatus that performs product registration and a settlement apparatus that performs settlement of a registered product are separated. The settlement apparatus 20 according to the present example embodiment may be any settlement apparatus as long as the settlement apparatus includes an input function for electronically settling a payment amount, such as a credit card, electronic money, and code settlement.

The electronic receipt issuing apparatus 10 provides an electronic receipt issuing service that issues an electronic receipt, based on settlement information received from an external apparatus, and stores the issued electronic receipt in association with electronic receipt service-user identification information. In other words, when user identification information of the service and information related to a product purchased at a store and the like are input to the electronic receipt issuing apparatus 10, the electronic receipt issuing apparatus 10 generates an electronic receipt, based on the information related to the product purchased at the store and the like, and stores the generated electronic receipt in association with the input user identification information in a storage unit included in the electronic receipt issuing apparatus 10. A user can log in to the electronic receipt issuing apparatus 10 by operating a predetermined terminal, and display his/her own electronic receipt on the terminal. Note that, the electronic receipt issuing system according to the present example embodiment can issue an electronic receipt by using biometric information even when a user does not bring user identification information of the service at a time of shopping at a store and the like.

Further, the electronic receipt issuing apparatus 10 includes a storage unit, and stores second user registration information in which electronic receipt service-user identification information and biometric information about each user are associated with each other. As the biometric information, a fingerprint, an iris, a face image, a voiceprint, a feature value of the fingerprint, the iris, the face image, and the voiceprint, and the like are exemplified, which is not limited thereto. Then, the electronic receipt issuing apparatus 10 performs biometric authentication, based on biometric information received from an external apparatus.

A flow of processing of the electronic receipt issuing system is as follows.

(1) Settlement content determination information that determines a settlement content is input to the settlement apparatus 20 via an input apparatus included in the settlement apparatus 20. The processing is as described in the first example embodiment.

Further, cash, settlement service related information, and the like are input to the settlement apparatus 20 via the input apparatus included in the settlement apparatus 20. The settlement service related information is as described in the first example embodiment.

Further, biometric information is input to the settlement apparatus 20 via the input apparatus included in the settlement apparatus 20. The input apparatus exemplified above may be used, and another apparatus that achieves an input of biometric information, such as a fingerprint sensor, may be used.

(2) The settlement apparatus 20 computes a settlement amount, based on the settlement content determination information input in (1). Then, the settlement apparatus 20 performs settlement of the computed settlement amount, based on the computed settlement amount, and the cash and the settlement service related information being input in (1). Then, the settlement apparatus 20 discharges a product and a ticket, releases a lock of a parking area and a parking bicycle area, opens a gate of a parking lot, locks a locker, and releases a lock of a locker.

(3) When the settlement in (2) is completed, the settlement apparatus 20 transmits the biometric information input in (1) and settlement information indicating a settlement content to the electronic receipt issuing apparatus 10. The settlement information is as described in the first example embodiment.

(4) The electronic receipt issuing apparatus 10 performs biometric authentication that compares the biometric information acquired in (3) and the second user registration information.

(5) When a result of the biometric authentication in (4) indicates success, the electronic receipt issuing apparatus 10 issues an electronic receipt, based on the settlement information received in (3). Then, the electronic receipt issuing apparatus 10 stores the issued electronic receipt in association with the electronic receipt service-user identification information determined by the biometric authentication in (4), and transmits the issued electronic receipt to a notification destination registered in association with the electronic receipt service-user identification information.

Note that, when the result of the biometric authentication in (4) indicates failure, the electronic receipt issuing apparatus 10 does not perform the processing in (5).

Next, a configuration of the apparatus included in the electronic receipt issuing system according to the present example embodiment will be described in detail. One example of a hardware configuration of each of the electronic receipt issuing apparatus 10, and the settlement apparatus 20 is similar to that in the first and second example embodiments.

Figure 9:
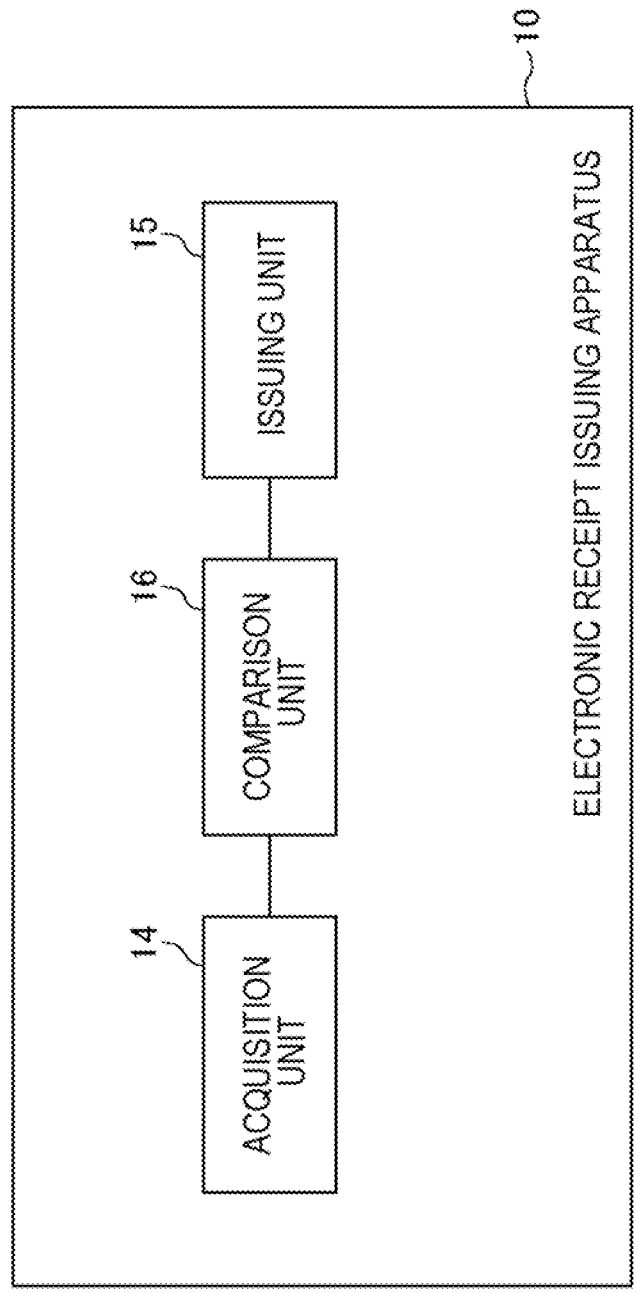
FIG. 9 is one example of a functional block diagram of the electronic receipt issuing apparatus according to the present example embodiment.

Next, one example of a functional configuration of the electronic receipt issuing apparatus 10 will be described. As illustrated in a functional block diagram in FIG. 9, the electronic receipt issuing apparatus 10 includes an acquisition unit 14, an issuing unit 15, and a comparison unit 16.

The acquisition unit 14 acquires biometric information input to the settlement apparatus 20, and settlement information indicating a settlement content in the settlement apparatus 20. The settlement information is as described in the first example embodiment.

The comparison unit 16 performs biometric authentication that compares the biometric information acquired by the acquisition unit 14 and second user registration information. The second user registration information is information in which electronic receipt service-user identification information and biometric information about each user are associated with each other. When biometric authentication is successful, the comparison unit 16 determines electronic receipt service-user identification information registered in association with the biometric information acquired by the acquisition unit 14.

When a result of biometric authentication using biometric information input to the settlement apparatus 20 indicates success, the issuing unit 15 issues an electronic receipt, based on the settlement information acquired by the acquisition unit 14. The electronic receipt can include information (for example: a purchased product name, a purchased service name, a service name to be used or being used, and a content of a purchased ticket) that determines a settlement content, a settlement amount, settlement date and time, a settlement method, information that identifies the settlement apparatus 20 that performs settlement, and the like.

The issuing unit 15 stores, in the storage unit included in the electronic receipt issuing apparatus 10, the issued electronic receipt in association with the electronic receipt service-user identification information determined by the biometric authentication by the comparison unit 16. Further, the issuing unit 15 can transmit the issued electronic receipt to a notification destination (for example: an e-mail address and an SNS account) registered in association with the electronic receipt service-user identification information.

Note that, when a result of biometric authentication using biometric information input to the settlement apparatus 20 indicates failure, the issuing unit 15 does not issue an electronic receipt.

Figure 10:
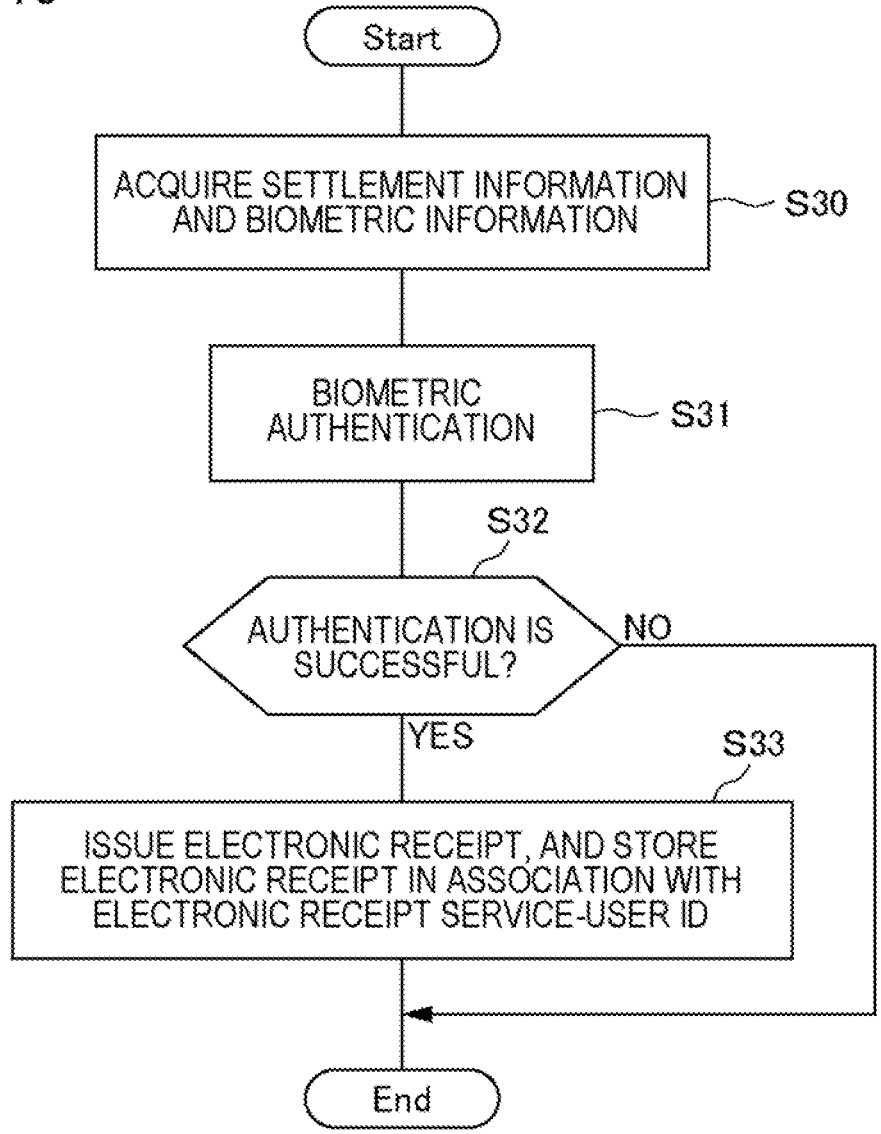
FIG. 10 is a flowchart illustrating one example of a flow of processing of the electronic receipt issuing apparatus according to the present example embodiment.

Next, one example of a flow of processing of the electronic receipt issuing apparatus 10 will be described by using a flowchart in FIG. 10.

First, the electronic receipt issuing apparatus 10 acquires biometric information input to the settlement apparatus 20, and settlement information indicating a settlement content in the settlement apparatus 20 (S30). Next, the electronic receipt issuing apparatus 10 performs biometric authentication that compares the biometric information acquired in S30 and second user registration information (S31). The second user registration information is information in which electronic receipt service-user identification information and biometric information about each user are associated with each other. When the biometric authentication is successful, the electronic receipt issuing apparatus 10 determines electronic receipt service-user identification information registered in association with the biometric information acquired in S30.

When the biometric authentication in S31 is successful (Yes in S32), the electronic receipt issuing apparatus 10 issues an electronic receipt, based on the settlement information acquired in S30, stores, in the storage unit included in the electronic receipt issuing apparatus 10, the issued electronic receipt in association with the electronic receipt service-user identification information determined by the biometric authentication in S31 (S33), and then ends the processing.

On the other hand, when the biometric authentication in S31 is in failure (No in S32), the electronic receipt issuing apparatus 10 ends the processing without issuing an electronic receipt.

The electronic receipt issuing apparatus 10 according to the present example embodiment described above can achieve an advantageous effect similar to that in the second example embodiment.

Fourth Example Embodiment

An electronic receipt issuing apparatus 10 according to a present example embodiment is different from the first to third example embodiments in a point that the electronic receipt issuing apparatus 10 according to the present example embodiment includes a means for notifying, by a characteristic method, a customer that an electronic receipt is issued when the electronic receipt issuing apparatus 10 issues the electronic receipt. Details will be described below.

An overall perspective and an overview of an electronic receipt issuing system according to the present example embodiment is similar to that in any of the first to third example embodiments.

One example of a hardware configuration of each of the electronic receipt issuing apparatus 10, a settlement apparatus 20, and a settlement server 30 according to the present example embodiment is similar to that in the first to third example embodiments.

Figure 11:
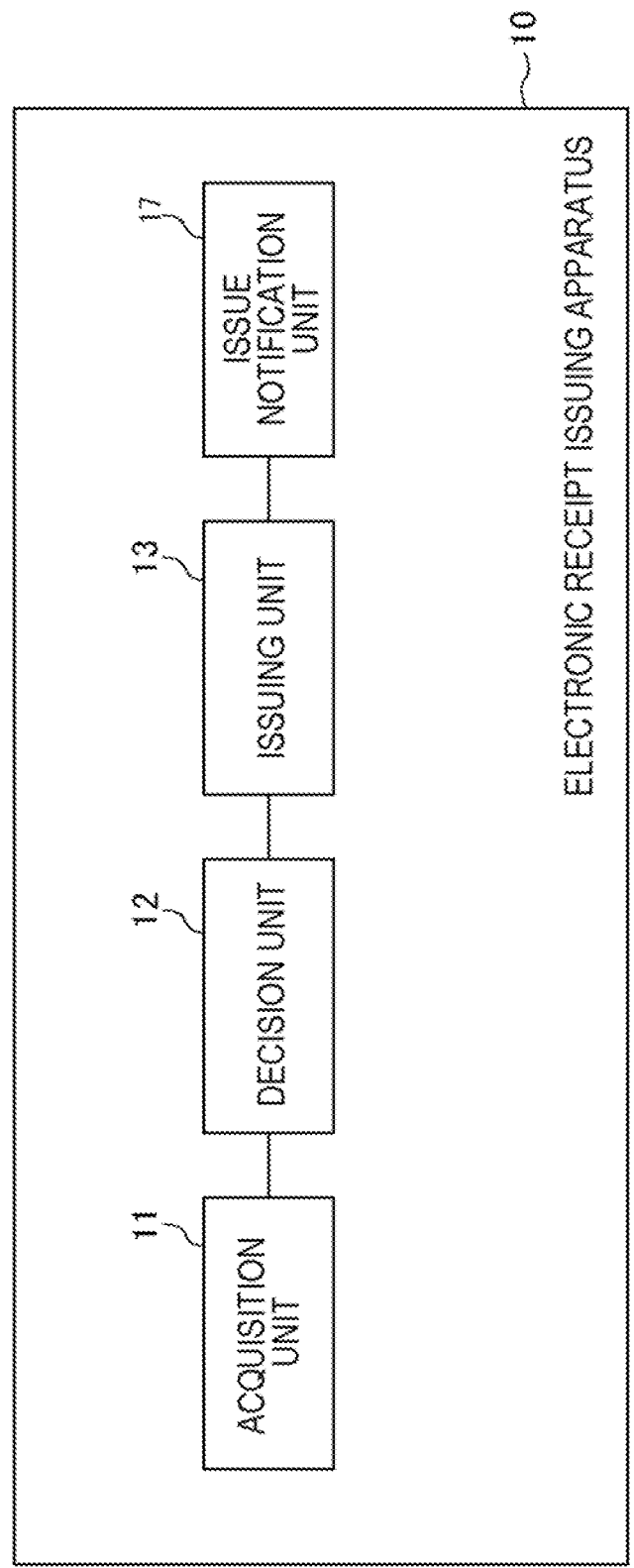
FIG. 11 is one example of a functional block diagram of the electronic receipt issuing apparatus according to the present example embodiment.
Figure 12:
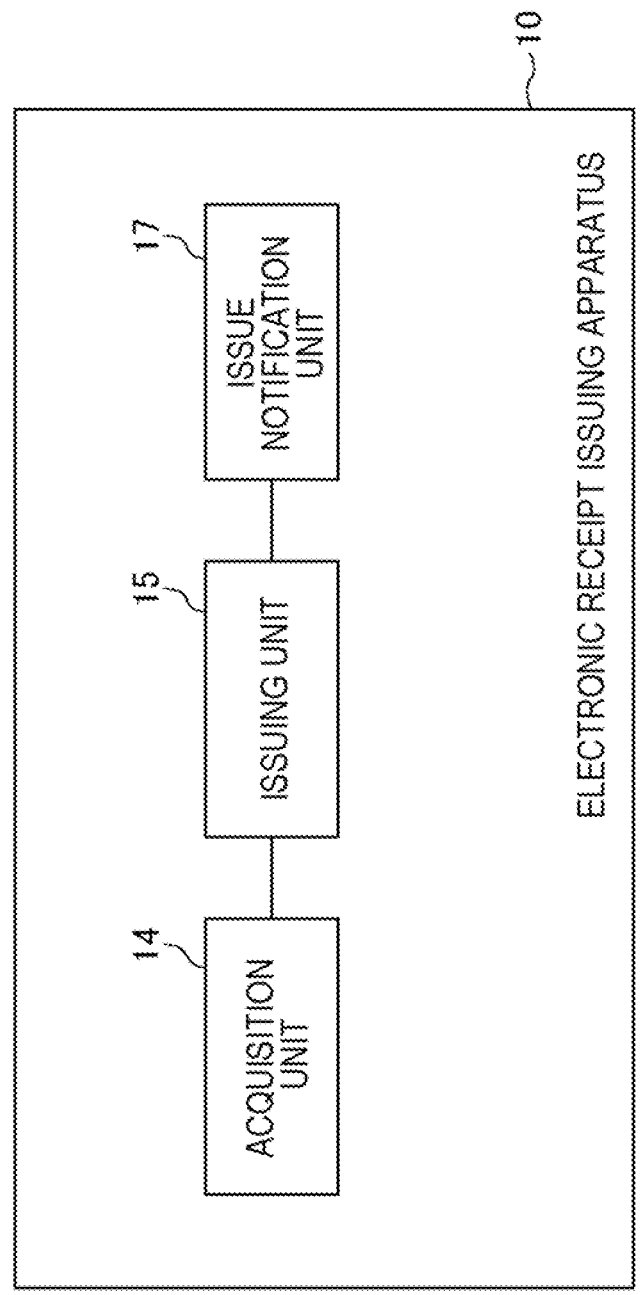
FIG. 12 is one example of a functional block diagram of the electronic receipt issuing apparatus according to the present example embodiment.
Figure 13:
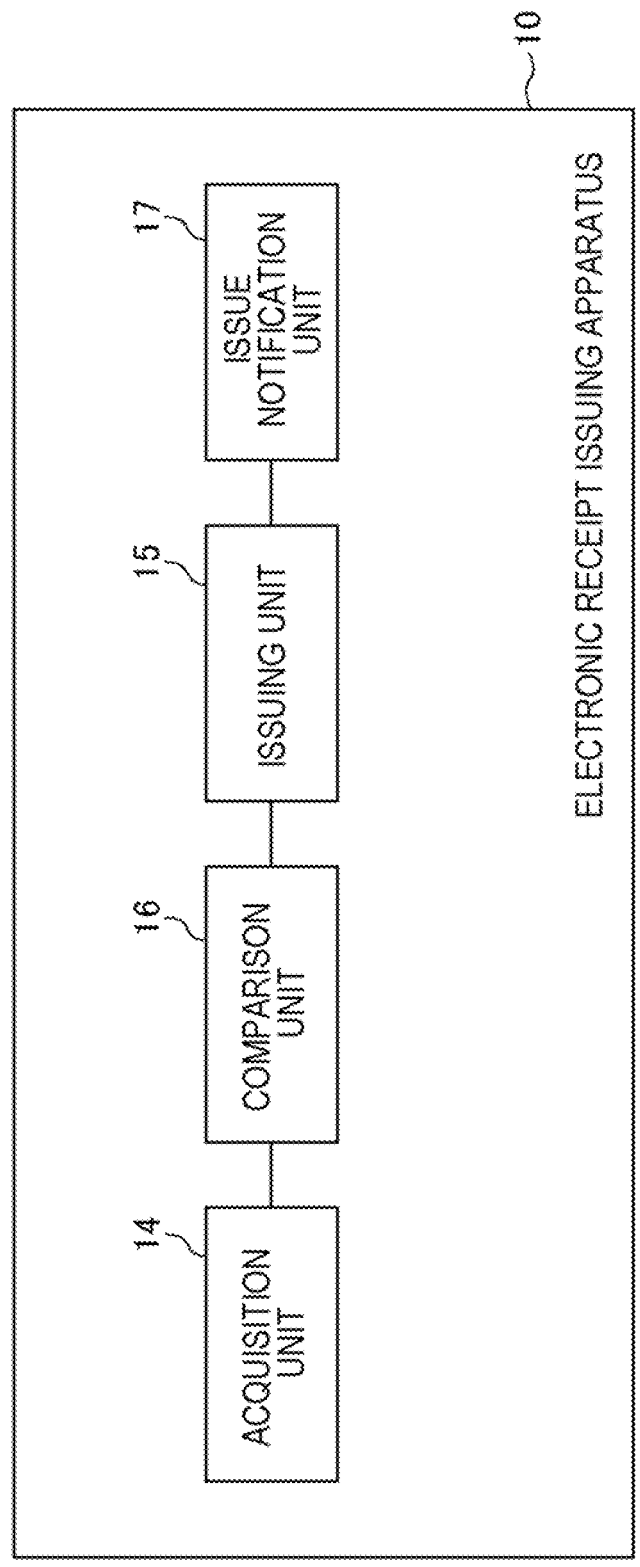
FIG. 13 is one example of a functional block diagram of the electronic receipt issuing apparatus according to the present example embodiment.

One example of a functional block diagram of the electronic receipt issuing apparatus 10 is illustrated in any of FIGS. 11 to 13.

The functional block diagram in FIG. 11 is acquired by adding an issue notification unit 17 to the functional block diagram (FIG. 3) of the electronic receipt issuing apparatus 10 described in the first example embodiment.

The functional block diagram in FIG. 12 is acquired by adding an issue notification unit 17 to the functional block diagram (FIG. 6) of the electronic receipt issuing apparatus 10 described in the second example embodiment.

The functional block diagram in FIG. 13 is acquired by adding an issue notification unit 17 to the functional block diagram (FIG. 9) of the electronic receipt issuing apparatus 10 described in the third example embodiment.

A configuration of an acquisition unit 11, a decision unit 12, an issuing unit 13, an acquisition unit 14, an issuing unit 15, and a comparison unit 16 is as described in the first to third example embodiments.

The issue notification unit 17 notifies a customer that an electronic receipt is issued. The issue notification unit 17 includes a first issue notification unit transmitting, to the settlement apparatus 20, information indicating that an electronic receipt is issued when the issuing unit 13 or the issuing unit 15 issues the electronic receipt, and causing the settlement apparatus 20 to output the information indicating that the electronic receipt is issued. The settlement apparatus 20 can output information such as "electronic receipt is issued and stored", for example, via an output apparatus such as a display and a speaker.

Further, the first issue notification unit may transmit an issued electronic receipt to the settlement apparatus 20, and cause the settlement apparatus 20 to output the issued electronic receipt. The settlement apparatus 20 can output a received electronic receipt via an output apparatus such as a display.

Note that, the issue notification unit 17 may include a second issue notification unit in addition to the first issue notification unit or instead of the first issue notification unit. When the issuing unit 13 or the issuing unit 15 issues an electronic receipt, the second issue notification unit transmits information indicating that the electronic receipt is issued to a notification destination (for example: an e-mail address and an SNS account) registered in association with electronic receipt service-user identification information. Note that, the second issue notification unit may transmit the issued electronic receipt to the notification destination.

The electronic receipt issuing apparatus 10 according to the present example embodiment described above can achieve an advantageous effect similar to that in the first to third example embodiments. Further, the electronic receipt issuing apparatus 10 according to the present example embodiment can notify a customer of issue of an electronic receipt and a content of the issued electronic receipt via the settlement apparatus 20. Thus, immediately after settlement is performed by the settlement apparatus 20, a customer can be notified of issue of an electronic receipt and a content thereof.

Further, the electronic receipt issuing apparatus 10 according to the present example embodiment can notify a customer of issue of an electronic receipt and a content of the issued electronic receipt by using a notification destination registered by each customer. In this way, since the electronic receipt issuing apparatus 10 according to the present example embodiment can notify a customer by a method desired by the customer, the electronic receipt issuing apparatus 10 according to the present example embodiment is a user-friendly.

Fifth Example Embodiment

An electronic receipt issuing apparatus 10 according to a present example embodiment is different from the first to fourth example embodiments in a point that the electronic receipt issuing apparatus 10 according to the present example embodiment includes a means for issuing one electronic receipt by putting together settlement information that satisfies a predetermined condition. Details will be described below.

An overall perspective and an overview of an electronic receipt issuing system according to the present example embodiment is similar to that in any of the first to fourth example embodiments.

One example of a hardware configuration of each of the electronic receipt issuing apparatus 10, a settlement apparatus 20, and a settlement server 30 according to the present example embodiment is similar to that in the first to fourth example embodiments.

One example of a functional block diagram of the electronic receipt issuing apparatus 10 is illustrated in any of FIGS. 3, 6, 9, and 11 to 13. A configuration of an acquisition unit 11, a decision unit 12, an acquisition unit 14, a comparison unit 16, and an issue notification unit 17 is as described in the first to fourth example embodiments.

Settlement information according to the present example embodiment includes at least either one of information that identifies the settlement apparatus 20 and settlement date and time.

Then, when first settlement information and second settlement information being acquired by the acquisition unit 11 (or the acquisition unit 14) satisfy a predetermined condition, an issuing unit 13 (or an issuing unit 15) issues one electronic receipt including a settlement content indicated by the first settlement information and a settlement content indicated by the second settlement information.

The predetermined condition may be, for example, "settlement information is related to the same piece of electronic receipt service-user identification information", "information that identifies the settlement apparatus 20 being included in the first settlement information and information that identifies the settlement apparatus 20 being included in the second settlement information are the same", and "a difference between settlement date and time included in the first settlement information and settlement date and time included in the second settlement information is within a predetermined period of time" that are connected to each other by an AND condition.

According to the condition, when the same customer continuously performs, for each product, settlement of a plurality of products (may be services and the like) by the same settlement apparatus (for example: a vending machine and the like) 20 and a time difference of the settlement is within a predetermined period of time, an electronic receipt in which the settlement is put together into one is issued.

In addition, the predetermined condition may be, for example, "settlement information is related to the same electronic receipt service-user identification information", "information that identifies the settlement apparatus 20 being included in the first settlement information and information that identifies the settlement apparatus 20 being included in the second settlement information belong to the same group", and "a difference between settlement date and time included in the first settlement information and settlement date and time included in the second settlement information is within a predetermined period of time" that are connected to each other by an AND condition.

As illustrated in FIG. 14, group information indicating a group to which each settlement apparatus 20 belongs is generated and stored in a storage unit included in the electronic receipt issuing apparatus 10. Then, the issuing unit 13 (or the issuing unit 15) can decide "whether information that identifies the settlement apparatus 20 being included in the first settlement information and information that identifies the settlement apparatus 20 being included in the second settlement information belong to the same group", based on the group information. For example, grouping may be performed in such a way that the settlement apparatuses (for example: vending machines) 20 installed close to each other belong to the same group.

According to the condition, when the same customer continuously performs settlement of a product (may be a service and the like) by each of the settlement apparatuses (for example: vending machines) 20 close to each other and a time difference of the settlement is within a predetermined period of time, an electronic receipt in which the settlement is put together into one is issued.

The electronic receipt issuing apparatus 10 according to the present example embodiment described above can achieve an advantageous effect similar to that in the first to fourth example embodiments.

Further, for example, in a similar manner as a vending machine, settlement of a plurality of products (may be services and the like) may not be able to be performed together and may be performed individually depending on a configuration of the settlement apparatus 20. In this case, when an electronic receipt is issued for each settlement, the number of electronic receipts to be issued increases and management becomes troublesome. The electronic receipt issuing apparatus 10 according to the present example embodiment can reduce the inconvenience.

Herein, modification examples applicable to all of the example embodiments will be described. A "storage unit that is included in the electronic receipt issuing apparatus 10 and stores various pieces of information" described above may be included in an external apparatus being physically and/or logically separated from the electronic receipt issuing apparatus 10. In this case, the electronic receipt issuing apparatus 10 and the external apparatus are configured to be communicable to each other. Then, the electronic receipt issuing apparatus 10 is configured to be able to access information stored in the storage unit.

Further, a "storage unit that is included in the biometric authentication server 40 and stores various pieces of information" described above may be included in an external apparatus being physically and/or logically separated from the biometric authentication server 40. In this case, the biometric authentication server 40 and the external apparatus are configured to be communicable to each other. Then, the biometric authentication server 40 is configured to be able to access information stored in the storage unit. The advantageous effect described above is also achieved in the modification examples.

Hereinafter, examples of reference manners are presented as supplementary notes.

1. An electronic receipt issuing apparatus, including:
    an acquisition unit acquiring settlement user identification information that is input to a settlement apparatus and identifies a user of a predetermined settlement service, and settlement information indicating a settlement content in the settlement apparatus;
    a decision unit deciding whether the settlement user identification information acquired by the acquisition unit is registered in user registration information in which the settlement user identification information is registered in association with electronic receipt service-user identification information that identifies a user of an electronic receipt issuing service; and
    an issuing unit issuing an electronic receipt, based on the settlement information, when the settlement user identification information acquired by the acquisition unit is registered in the user registration information.

2. An electronic receipt issuing apparatus, including:
    an acquisition unit acquiring electronic receipt service-user identification information that identifies a user of an electronic receipt issuing service determined by biometric information input to a settlement apparatus or biometric authentication using the biometric information, and settlement information indicating a settlement content in the settlement apparatus; and
    an issuing unit issuing an electronic receipt, based on the settlement information, when a result of biometric authentication using the biometric information indicates success.

3. The electronic receipt issuing apparatus according to supplementary note 1 or 2, further including
    a first issue notification unit transmitting, to the settlement apparatus, information indicating that the electronic receipt is issued when the issuing unit issues the electronic receipt, and causing the settlement apparatus to output information indicating that the electronic receipt is issued.

4. The electronic receipt issuing apparatus according to supplementary note 3, wherein
    the first issue notification unit transmits the issued electronic receipt to the settlement apparatus, and causes the settlement apparatus to output the issued electronic receipt.

5. The electronic receipt issuing apparatus according to any of supplementary notes 1 to 4, further including
    a second issue notification unit transmitting, to a notification destination registered in association with the electronic receipt service-user identification information, information indicating that the electronic receipt is issued when the issuing unit issues the electronic receipt.

6. The electronic receipt issuing apparatus according to any of supplementary notes 1 to 5, wherein
    the settlement information includes at least either one of information that identifies the settlement apparatus and settlement date and time, and,
    when first settlement information and second settlement information being acquired by the acquisition unit satisfy a predetermined condition, the issuing unit issues one electronic receipt including a settlement content indicated by the first settlement information and a settlement content indicated by the second settlement information.

7. The electronic receipt issuing apparatus according to supplementary note 6, wherein
the predetermined condition is a condition in which settlement information is related to the same electronic receipt service-user identification information, information that identifies the settlement apparatus being included in the first settlement information and information that identifies the settlement apparatus being included in the second settlement information are same, and a difference between the settlement date and time included in the first settlement information and the settlement date and time included in the second settlement information is within a predetermined period of time.

8. The electronic receipt issuing apparatus according to supplementary note 6, wherein
the predetermined condition is a condition in which settlement information is related to the same electronic receipt service-user identification information, information that identifies the settlement apparatus being included in the first settlement information and information that identifies the settlement apparatus being included in the second settlement information belong to a same group, and a difference between the settlement date and time included in the first settlement information and the settlement date and time included in the second settlement information is within a predetermined period of time.

9. The electronic receipt issuing apparatus according to any of supplementary notes 1 to 8, wherein
the settlement apparatus includes at least one of a vending machine, a ticket-vending machine, an automated payment machine installed in a parking lot or a bicycle parking lot, and a settlement apparatus for a locker and at an automated store.

10. An electronic receipt issuing method executed by a computer, including:
an acquisition step of acquiring settlement user identification information that is input to a settlement apparatus and identifies a user of a predetermined settlement service, and settlement information indicating a settlement content in the settlement apparatus;
a decision step of deciding whether the settlement user identification information acquired in the acquisition step is registered in user registration information in which the settlement user identification information is registered in association with electronic receipt service-user identification information that identifies a user of an electronic receipt issuing service; and
an issuing step of issuing an electronic receipt, based on the settlement information, when the settlement user identification information acquired in the acquisition step is registered in the user registration information.

11. A program causing a computer to function as:
an acquisition unit acquiring settlement user identification information that is input to a settlement apparatus and identifies a user of a predetermined settlement service, and settlement information indicating a settlement content in the settlement apparatus;
a decision unit deciding whether the settlement user identification information acquired by the acquisition unit is registered in user registration information in which the settlement user identification information is registered in association with electronic receipt service-user identification information that identifies a user of an electronic receipt issuing service; and
an issuing unit issuing an electronic receipt, based on the settlement information, when the settlement user identification information acquired by the acquisition unit is registered in the user registration information.

This application is based upon and claims the benefit of priority from Japanese patent application No. 2018-247636, filed on Dec. 28, 2018, the disclosure of which is incorporated herein in its entirety by reference.

What is claimed is:

1. An electronic receipt issuing apparatus comprising:
at least one memory configured to store one or more instructions; and
at least one processor configured to execute the one or more instructions to:
acquire settlement user identification information that is input to a first settlement apparatus by a user and identifies the user as part of a predetermined settlement service, the acquired settlement user identification information including biometric information of the user;
acquire first settlement information indicating a settlement content in the first settlement apparatus of a first settlement, the first settlement information including information that identifies the first settlement apparatus and a settlement date and time of the first settlement, the first settlement apparatus performing an action responsive to success of the first settlement, the action including one or more of dispensing an item and controlling an external device;
acquire second settlement information indicating a settlement content of a second settlement, the first settlement information including information that identifies a second settlement apparatus;
decide whether the acquired settlement user identification information is registered in user registration information in which the settlement user identification information is registered in association with electronic receipt service-user identification information that identifies the user as part of an electronic receipt issuing service, the electronic receipt service-user identification information determined by biometric authentication using the biometric information of the user;
decide whether the first settlement apparatus and the second settlement apparatus belong to a same group by retrieving from a database table a first group identifier of the first settlement apparatus that is stored in the database table in association with a first settlement apparatus identifier of the first settlement apparatus included in the first settlement information, by retrieving from the table a second group identifier of the second settlement apparatus that is stored in the table in association with a second settlement apparatus identifier of the second settlement apparatus included in the second settlement information, and by determining whether the first and second group identifiers are identical; and
issue one electronic receipt including the settlement content of the first settlement and the settlement content of the second settlement responsive to the decision indicating the acquired settlement user identification information is registered in association with the electronic receipt service-user identification information determined by the biometric authentication and responsive to determining that the settlement content indicated by the first settlement information and the settlement content indicated by the second settlement information satisfy a predetermined condition, wherein the predetermined condition is that the first settlement apparatus and the second settlement apparatus belong to the same group, and the one electronic receipt is sent for both the first settlement and the second settlement in lieu of individual receipts for the first and second settlements.

2. An electronic receipt issuing system comprising the electronic receipt issuing apparatus and the settlement apparatus of claim 1.

3. The electronic receipt issuing apparatus according to claim 1, wherein the processor is further configured to execute the one or more instructions to transmit, to the settlement apparatus, information indicating that the electronic receipt is issued, and causing the settlement apparatus to output information indicating that the electronic receipt was issued.

4. The electronic receipt issuing apparatus according to claim 3, wherein the processor is further configured to execute the one or more instructions to transmit the issued electronic receipt to the settlement apparatus, and causes the settlement apparatus to output the issued electronic receipt.

5. The electronic receipt issuing apparatus according to claim 1, wherein the processor is further configured to execute the one or more instructions to transmit, to a notification destination registered in association with the electronic receipt service-user identification information, information indicating that the electronic receipt was issued.

6. The electronic receipt issuing apparatus according to claim 1, wherein the predetermined condition is further that a difference between the settlement date and time included in the first settlement information and a settlement date and time included in the second settlement information is within a predetermined period of time.

7. The electronic receipt issuing apparatus according to claim 1, wherein the predetermined condition is further that a difference between the settlement date and time included in the first settlement information and a settlement date and time included in the second settlement information is within a predetermined period of time.

8. The electronic receipt issuing apparatus according to claim 1, wherein each of the first and second settlement apparatuses includes at least one of a vending machine, a ticket-vending machine, an automated payment machine installed in a parking lot or a bicycle parking lot, and a settlement apparatus for a locker and at an automated store.

9. An electronic receipt issuing method executed by a computer, comprising:

acquiring settlement user identification information that is input to a first settlement apparatus by a user and identifies the user as part of a predetermined settlement service, the acquired settlement user identification information including biometric information of the user;

acquiring first settlement information indicating a settlement content in the first settlement apparatus of a first settlement, the first settlement information including information that identifies the first settlement apparatus and a settlement date and time of the first settlement, the first settlement apparatus performing an action responsive to success of the first settlement, the action including one or more of dispensing an item and controlling an external device;

acquiring second settlement information indicating a settlement content of a second settlement, the first settlement information including information that identifies a second settlement apparatus;

deciding whether the acquired settlement user identification information is registered in user registration information in which the biometric information of the settlement user identification information is registered in association with electronic receipt service-user identification information that identifies the user as part of an electronic receipt issuing service, the electronic receipt service-user identification information determined by biometric authentication using the biometric information of the user;

deciding whether the first settlement apparatus and the second settlement apparatus belong to a same group by retrieving from a database table a first group identifier of the first settlement apparatus that is stored in the database table in association with a first settlement apparatus identifier of the first settlement apparatus included in the first settlement information, by retrieving from the table a second group identifier of the second settlement apparatus that is stored in the table in association with a second settlement apparatus identifier of the second settlement apparatus included in the second settlement information, and by determining whether the first and second group identifiers are identical; and issuing one electronic receipt including the settlement content of the first settlement and the settlement content of the second settlement responsive to the decision indicating the acquired settlement user identification information is registered in association with the electronic receipt service-user identification information determined by the biometric authentication and responsive to determining that the settlement content indicated by the first settlement information and the settlement content indicated by the second settlement information satisfy a predetermined condition, wherein the predetermined condition is that the first settlement apparatus and the second settlement apparatus belong to the same group, and the one electronic receipt is sent for both the first settlement and the second settlement in lieu of individual receipts for the first and second settlements.

10. A non-transitory storage medium storing a program causing a computer to:

acquire settlement user identification information that is input to a first settlement apparatus by a user and identifies the user as part of a predetermined settlement service, the acquired settlement user identification information including biometric information of the user;

acquire first settlement information indicating a settlement content in the first settlement apparatus of a first settlement, the first settlement information including information that identifies the first settlement apparatus and a settlement date and time of the first settlement, the first settlement apparatus performing an action responsive to success of the first settlement, the action including one or more of dispensing an item and controlling an external device;

acquire second settlement information indicating a settlement content of a second settlement, the first settlement information including information that identifies a second settlement apparatus;

decide whether the acquired settlement user identification information is registered in user registration information in which the settlement user identification information is registered in association with electronic receipt service-user identification information that identifies the user as part of an electronic receipt issuing service, the electronic receipt service-user identification information determined by biometric authentication using the biometric information of the user;

decide whether the first settlement apparatus and the second settlement apparatus belong to a same group by retrieving from a database table a first group identifier of the first settlement apparatus that is stored in the database table in association with a first settlement apparatus identifier of the first settlement apparatus included in the first settlement information, by retrieving from the table a second group identifier of the second settlement apparatus that is stored in the table in association with a second settlement apparatus identifier of the second settlement apparatus included in the second settlement information, and by determining whether the first and second group identifiers are identical; and issue one electronic receipt including the settlement content of the first settlement and the settlement content of the second settlement responsive to the decision indicating the acquired settlement user identification information is registered in association with the electronic receipt service-user identification information determined by the biometric authentication and responsive to determining that the settlement content indicated by the first settlement information and the settlement content indicated by the second settlement information satisfy a predetermined condition, wherein the predetermined condition is that the first settlement apparatus and the second settlement apparatus belong to the same group, and the one electronic receipt is sent for both the first settlement and the second settlement in lieu of individual receipts for the first and second settlements.

11. The settlement apparatus of claim 1 wherein the predetermined condition is further that a difference between the settlement date and time included in the first settlement information and a settlement date and time included in the second settlement information is within a predetermined period of time.

12. The electronic receipt issuing method of claim 9 wherein the predetermined condition is further that a difference between the settlement date and time included in the first settlement information and a settlement date and time included in the second settlement information is within a predetermined period of time.

13. The non-transitory storage medium of claim 10 wherein the predetermined condition is further that a difference between the settlement date and time included in the first settlement information and a settlement date and time included in the second settlement information is within a predetermined period of time.

\* \* \* \* \*